US012404988B2

(12) United States Patent
Schwaighofer et al.

(10) Patent No.: US 12,404,988 B2
(45) Date of Patent: Sep. 2, 2025

(54) OPTICAL ELEMENT AND LUMINAIRE EQUIPPED THEREWITH

(71) Applicant: ZUMTOBEL LIGHTING GMBH, Dornbirn (AT)

(72) Inventors: Andreas Schwaighofer, Dornbirn (AT); Thibaut Escourrou, Dornbirn (AT); Christian Kohler, Dornbirn (AT); Thomas Rein, Dornbirn (AT)

(73) Assignee: Zumtobel Lighting GmbH, Dornbirn (AT)

( * ) Notice: Subject to any disclaimer, the term of this patent is extended or adjusted under 35 U.S.C. 154(b) by 0 days.

(21) Appl. No.: 18/695,927

(22) PCT Filed: Nov. 15, 2022

(86) PCT No.: PCT/EP2022/081885

§ 371 (c)(1),
(2) Date: Mar. 27, 2024

(87) PCT Pub. No.: WO2023/084101

PCT Pub. Date: May 19, 2023

(65) Prior Publication Data

US 2025/0116389 A1 Apr. 10, 2025

(30) Foreign Application Priority Data

Nov. 15, 2021 (EP) .................................... 21208173
Apr. 28, 2022 (DE) ..................... 10 2022 110 370.6

(51) Int. Cl.
*F21V 7/00* (2006.01)
*F21V 5/00* (2018.01)

(Continued)

(52) U.S. Cl.
CPC ............ *F21V 7/0091* (2013.01); *F21V 5/007* (2013.01); *F21Y 2105/16* (2016.08); *F21Y 2113/00* (2013.01)

(58) Field of Classification Search
CPC .... F21V 7/0091; F21V 5/007; F21Y 2113/00; F21Y 2105/16

(Continued)

(56) References Cited

U.S. PATENT DOCUMENTS 10,113,709 B2 * 10/2018 Ebner ..................... F21V 5/008
2012/0020103 A1 1/2012 Okada
2016/0305618 A1 10/2016 Miller

FOREIGN PATENT DOCUMENTS

DE 102012205067 A1 10/2013
EP 3084496 A1 10/2016
EP 3477189 A1 5/2019

OTHER PUBLICATIONS

PCT/EP2022/081885, International Search Report and Written Opinion dated Mar. 17, 2023, 6 pages.

* cited by examiner

*Primary Examiner* — Laura K Tso
(74) *Attorney, Agent, or Firm* — Andrus Intellectual Property Law, LLP

(57) ABSTRACT

An optical element (1) for influencing light emitted by light sources (7) has at least one pair of optical system elements (10) which are arranged next to one another and integrally formed with one another. A light entrance region (4) and a deflecting surface portion (5) are formed on the back side (2) of each optical system element (10). Each optical system element (10) is designed so that first light rays (L1) from an assigned light source (7) are directly incident on the deflecting surface portion (5) and undergo total-internal reflection at the deflecting surface portion (5), and subsequently leave (Continued)

the optical element (1) via the front-side surface portion (6). Each optical system element (10) is also designed so that second light rays (L2) of the light from the assigned light source (7 are directly incident on the front-side surface portion (6), undergo total-internal reflection at the front-side surface portion (6), subsequently are incident on the deflecting surface portion (5), undergo total-internal reflection at the deflecting surface portion (5), and subsequently leave the optical element (1) via the front-side surface portion (6).

28 Claims, 4 Drawing Sheets

(51) Int. Cl.
*F21Y 105/16* (2016.01)
*F21Y 113/00* (2016.01)

(58) Field of Classification Search
USPC .................................................... 362/311.02
See application file for complete search history.

CUT LINE B-B

CUT LINE A-A

OPTICAL ELEMENT AND LUMINAIRE EQUIPPED THEREWITH

CROSS-REFERENCE TO RELATED APPLICATION

The present application is the U.S. national stage application of international application PCT/EP2022/081885 filed Nov. 15, 2022, which international application was published on Mar. 19, 2023 as International Publication WO 2023/084101 A1. The international application claims priority to European Patent Application 21208173.1, filed Nov. 15, 2021 and German Patent Application No. 10 2022 110 370.6, filed Apr. 28, 2022.

TECHNICAL FIELD OF THE INVENTION

The present invention relates to an optical element for influencing light emitted by light sources, and to a luminaire having such an optical element and also light sources for emitting light into the optical element.

BACKGROUND OF THE INVENTION

DE 10 2012 205 067 A1 discloses a luminaire having an LED (light-emitting diode) light source and a lens assembly for optically influencing the light emitted by the LED light source. The main body of the lens assembly is designed to be approximately frustoconical and has on its back side facing the LED light source a depression for the LED light source. The depression consists of a convexly shaped bottom area and side surfaces. Light rays which enter the lens assembly via the bottom area are bundled by the latter and then leave on the front side opposite the depression; during this process, the light rays do not experience any further interaction with a boundary surface of the lens assembly. Light rays entering the lens assembly via the side surfaces of the depression undergo total-internal reflection at the lateral surfaces of the lens assembly formed by the frustum shape and then leave also via the front side.

It has been found that with such a lens assembly a comparatively high luminance occurs in a central region of light emission. This bright region is attributable to those light rays which enter the lens assembly via the bottom area of the depression and then leave directly via the front side. Due to this high luminance, the light emission generally has an unpleasant effect on an observer looking at the front side of the lens assembly.

Optical elements are also known which have an elongated arrangement extending along a longitudinal axis. At both ends of the longitudinal axis, light-guiding wing portions extend away from the sides in a manner such as to project far and flatly toward the outside. Several light coupling regions are provided in a single row centrally on the back side along the longitudinal axis, via which light coupling regions light from light sources arranged correspondingly in series is coupled into the optical element. In order to emit the light largely homogeneously via a large-area front-side light emission surface, specifically the back side of this optical element or of its wing portions, has a stepped surface in order to distribute the light over the entire surface within the optical element by means of total-internal reflection. Such a design is known, for example, from EP 3 084 496 B1. The disadvantage of this configuration is that these optics only allow limited homogeneity at the light exit surface due to the LEDs arranged in a single row. In addition, the number of LEDs is overall limited due to them having to be arranged in a row. Furthermore, the possibility of suppressing glare is also limited due to the long optical paths and difficult-to-control amount of scattered light. The luminaire efficiency is also limited due to the given size of the light exit surface.

SUMMARY OF THE INVENTION

It is thus an object of the present invention to provide an optical element and a luminaire of the type mentioned at the outset equipped therewith, which makes possible a high degree of glare suppression and homogeneity with high efficiency.

This object is achieved by the subject matter of the independent claims. The dependent claims develop the central idea of the present invention in a particularly advantageous manner.

According to a first aspect, the present invention relates to an optical element for influencing light emitted by light sources. The optical element has a back side facing the light sources and a front side facing away from the light sources. The optical element has at least one pair of optical system elements which are arranged offset next to one another laterally along an offset axis and are integrally formed with one another. The optical system elements of the pair of optical system elements can each be optically assigned to another one of the light sources. The optical system elements of the pair of optical system elements jointly form the back side and jointly form the front side, i.e., they preferably each comprise a part of the front side and of the back side. A light entrance region for light from the assigned light source entering the respective optical system element is formed on the back side of each optical system element. A deflecting surface portion is further formed on the back side of each optical system element. A front-side surface portion is formed on the front side of each optical system element. Each optical system element is designed so that first light rays of the light from the assigned light source, which light rays enter the optical element via the light entrance region, are directly (i.e., preferably without further deflection in the optical element) incident on the deflecting surface portion, undergo total-internal reflection at the deflecting surface portion, and subsequently leave the optical element via the front-side surface portion. Each optical system element is further designed so that second light rays of the light from the assigned light source, which light rays enter the optical element via the light entrance region, are directly (i.e., preferably without further deflection in the optical element) incident on the front-side surface portion, undergo total-internal reflection at the front-side surface portion, subsequently are incident on the deflecting surface portion, undergo total-internal reflection at the deflecting surface portion, and subsequently leave the optical element via the front-side surface portion.

Compared to the same light emission surface of optical elements from the prior art (e.g., according to EP 3 084 496 B1), the optical element according to the invention increases (specifically doubles) the number of light-guiding regions and, due to the multiplication (doubling) of the optical system elements, reduces the individual optical path lengths. This ultimately results in better glare suppression and higher homogeneity of the emitted light. Overall, the side-by-side arrangement of the described optical system elements can significantly increase the efficiency of a luminaire equipped therewith. Enlarging the light exit surface in comparison with known systems (such as, for example, according to EP 3 084 496 B1) can additionally increase efficiency and thus result in a higher light yield (luminaire efficiency factor (LEF), measured in lumens per watt (lm/W)) per LED. Within the scope of the invention, the "pair" preferably is a structurally recognizable unit and not purely the result of a virtual separation of two components from a plurality of identical components.

The optical system elements of the pair of optical system elements are preferably arranged offset next to one another laterally along the offset axis with respect to a vertical axis of the optical element. The vertical axis is preferably aligned parallel to a main emission direction of the light sources. Overall, a compact design of the optical element can thus be achieved. In addition, simple light coupling and light guidance can thus be achieved for common light emission of the optical system elements of the pair of optical system elements lying next to one another.

The optical system elements can each be designed so that the first light rays and/or the second light rays, after having undergone total-internal reflection at the deflecting surface portion, subsequently leave the optical element directly (i.e., preferably without further deflection in the optical element) via the front-side surface portion. The optical path of the light through the optical element can thus be optimized and, in particular, shortened, which in turn leads to a reduction of the scattered light, an improvement in glare suppression, and ultimately a particularly homogeneous light emission.

The deflecting surface portion can preferably have at least a first deflection portion which serves for total-internal reflection of the first light rays. Light guidance of the first light rays can thus be provided in an optimized manner by a defined provision of the first deflection portion.

The deflecting surface portion can preferably have at least a second deflection portion which serves for total-internal reflection of the second light rays. In this way, light guidance of the second light rays can also be provided in an optimized manner by a defined provision of the second deflection portion.

The first deflection portion and the second deflection portion can preferably be provided as structurally separate units. In this respect, the two deflection portions can be designed and provided in an optimized manner, independently of the respective other deflection portion, in accordance with their requirements and the desired light guidance. This results in a highly effective light guidance and a high luminaire efficiency.

Preferably, the first deflection portion lies closer to the light entrance region than does the second deflection portion. The optical element is thus designed to be optimized with respect to the light entrance region and light guidance of the respective first and second light rays. Moreover, in this way, the optical paths can be reduced overall by the optical element, which leads to a further improvement of the glare-suppression effect and to a better homogeneity.

The front-side surface portion preferably has at least a first outcoupling portion via which the first light rays leave the optical element. In this way, an outcoupling portion of the first light rays can be provided in an optimized design.

The front-side surface portion can preferably have at least a second outcoupling portion via which the second light rays leave the optical element. A second outcoupling portion for the second light rays can thus also be provided in a correspondingly optimized design.

The second outcoupling portion can extend in one plane. Similarly, all second outcoupling portions can also extend in one, i.e. the same, plane. A particularly homogeneous light emission via the optical element can thus be made possible. Moreover, this configuration results in a particularly aesthetic appearance of the optical element at its front side. The plane is preferably aligned parallel to the offset axis, so that, on the one hand, the light paths of the optical system elements are preferably comparable and thus designed for a particularly homogeneous light guidance of the entire optical element. Moreover, an optical element that is as compact as possible can be provided.

The front-side surface portion can preferably have an optical portion which serves for total-internal reflection of the second light rays. Light guidance of the second light rays can thus be defined and designed and provided in an optimized manner in accordance with the requirements.

The first outcoupling portion and the optical portion preferably overlap at least partially or are even identical. In this way, the optical element can be designed to be particularly compact with high functionality and, at the same time, high efficiency.

The light entrance regions are preferably each designed as a recess in the back side. In this way, a defined and preferably lens-like light entrance region can be provided.

The recess is preferably designed so as to be able to at least partially or completely receive the light source assigned to the optical system element. On the one hand, the light source can thus be securely positioned. On the other hand, light guidance can be provided very effectively—i.e., with high efficiency—starting from the light source.

On its side facing the front side, the recess can preferably be defined by a bottom portion, which, on the one hand, serves for a secure positioning of the light source. On the other hand, the bottom portion can support effective light coupling into the optical element.

The bottom portion can be designed, for example, as a light-guiding portion in order to guide the second light rays in a defined manner onto the front-side surface portion and preferably onto the optical portion, if present. Light guidance specifically of the second light rays can thus be further optimized, and the efficiency of the optical element can be further increased overall.

Depending on the requirements, the bottom portion can have any shape and can, for example, be planar, or curved or convex toward the recess. In this way, light guidance of the light from the light source—preferably of the second light rays—into the optical element can be optimized.

The recess can be defined laterally by at least one side wall portion. In this way, on the one hand, the light source can be provided particularly reliably, in particular when it can be, or is, received in the recess in part or completely. Furthermore, light guidance of the light from the light source—preferably of the first light rays—into the optical element can be further optimized and the efficiency can be increased overall.

Preferably, the recess can be defined laterally by at least two side wall portions provided on opposite sides in the offset direction. Light guidance can thus be optimized accordingly in particular along the main light paths of the optical system elements.

However, it is also conceivable for the recess to be preferably defined by the side wall portion(s) so as to be laterally circumferentially closed, so that, on the one hand, the light source can be placed particularly securely, and, on the other hand, light guidance can be further optimized and the efficiency can be further increased.

The at least one side wall portion can preferably be designed as a further light-guiding portion in order to guide the first light rays in a defined manner onto the deflecting surface portion and preferably onto the first deflection portion, if present. In this way, light guidance can be optimized directly downstream of the light source, and the light path can thus be optimized overall, and the efficiency can thus be further increased by the optical element.

The at least one side wall portion can have any shape, and is preferably planar or curved or convex. In this way, the corresponding side wall portion can, for example, be designed to be optimized for light guidance of the first light rays.

Each of the optical system elements can have a lens head on its back side which comprises the light entrance region and at least part of the deflecting surface portion, preferably the first deflection portion. By providing such a lens head, light coupling and initial light guidance of the light coupled into the optical element by a light source via the light entrance region can be optimized and can thus be highly effective.

Preferably, said part of the deflecting surface portion can at least partially enclose the light entrance region laterally, can preferably flank the light entrance region on both sides along the offset direction or offset axis, or can even enclose the light entrance region laterally such as to be circumferentially closed. In this way, the corresponding deflecting surface portion, and preferably the first deflection portion, can be provided such as to be optimized with respect to the light entrance region. This leads to a configuration of the optical element that is compact in particular in terms of height, i.e., along the vertical axis.

The optical system elements can each have two wing portions. These wing portions preferably serving as light-guiding portions make possible a good and effective light guidance for homogeneous light emission while at the same time providing good glare suppression and high efficiency. Due to the multiplication of the optical system elements as compared to known optical elements (e.g., EP 3 084 496 B1), a compact design and thus an overall steeper wing portion can thus be provided, which further promotes the above-described positive effects.

Preferably, the wing portions of each optical system element can extend obliquely forward from the light entrance region, or preferably from the lens head (if present), and away from one another. For example, the wing portions each extend obliquely to the vertical axis or main emission direction. A good and preferably uniform light distribution and overall homogeneous light emission with high efficiency and overall good glare suppression can thus be provided.

The wing portions of each optical system element can preferably extend in a V-shaped flared manner from the light entrance region, or preferably from the lens head (if present), toward the front side (i.e., forward and away from the light entrance region). Thus, in addition to effective light guidance for achieving the advantages described above, the aesthetic appearance of the optical element can be further increased.

It should be noted that each of the optical system elements can further be designed so that, in addition to the first and second light rays, third light rays of the light from the assigned light source entering the optical element via the light entrance region are directly (i.e., preferably without further deflection in the optical element) incident on the front-side surface portion where they directly leave the optical element. For this purpose, the front-side surface portion can have at least a third outcoupling portion via which the third light rays leave the optical element. This third outcoupling portion can preferably be provided centrally of the optical system element with respect to the offset axis. The third outcoupling portion can preferably be provided between the two wing portions of each optical system element. Preferably, the third outcoupling portion can be provided at the base of the "Vs" of the wing portions that extend in a V-shaped manner. The third light rays can thus overall contribute to further increasing the homogeneity of the light emission. If necessary, the third outcoupling portion can be shaped such as to effect a desired light scattering. This applies to each light-guiding region of the deflecting surface portion and of the front-side surface portion.

One of the second outcoupling portions can be provided for each wing portion at an end of the respective wing portion facing away from the light entrance region. The corresponding light emission surface can thus be provided in a correspondingly exposed manner, which results, on the one hand, in optimal light guidance and sufficient homogeneity of light emission, and, on the other hand, in an aesthetic appearance of the optical element.

Each wing portion can be provided, on a forward-facing flank of the respective wing portion, with one of the first outcoupling portions and, if present, with one of the optical portions. In this way, the second outcoupling portions can be aligned at will and, as part of the V-shaped extension of the wing portions, can be for example at a defined angle relative to the vertical axis of the optical element, so that a particularly homogeneous light emission can be achieved overall.

Each wing portion can be provided with one of the second deflection portions on a backward-facing flank of the respective wing portion. These can thus also be provided in an optimized manner and can be provided, for example, in a correspondingly angled manner with respect to a vertical axis of the optical element in order thus to be aligned optimally for total-internal reflection.

One of the wing portions of each optical system element can preferably extend toward the respective other optical system element of the pair of optical system elements, and the other one of the two wing portions can correspondingly extend away from the respective other optical system element of the pair of optical system elements. A uniform light distribution to both sides and thus an overall extensive and, at the same time, homogeneous light emission can thus be achieved while providing good glare suppression and high efficiency of a luminaire equipped with the optical element.

The optical system elements of the pair of optical system elements are preferably formed integrally with one another via one of the wing portions, preferably the respective one wing portion. This facilitates not only a simple production of the optical element, but also results in particularly good handling thereof. Moreover, the optical system elements are thus integrally connected at their outward-facing front side, so that the aesthetic appearance of the optical element is improved. Moreover, the optical system elements can thus fulfill their optical function in a substantially optically independent manner so as to effect optimal light guidance and thus an overall homogeneous light emission. Particularly preferably, in the case described, the optical system elements are connected to one another only at or near the front-side surface portion or rather at or near the corresponding far or distal end of the respective wing portion.

The front-side surface portion can preferably have a depression directed toward the assigned light entrance region per optical system element. The front-side surface portion can thus be provided in an optimized manner for the above-described light guidance making possible, in particular, a simple geometric shape to achieve the total-internal reflection described above, in particular for the second light rays. In this way, the thus described surface in the region of the depression can also serve as a first outcoupling portion for the first light rays to outcouple the light from the optical element for light emission to the front. The optical element can thus be designed to be particularly compact overall.

The depression can preferably taper toward the light entrance region. This results in an overall compact design with, at the same time, good light guidance and high efficiency.

The depression can preferably be flanked laterally by the two wing portions or their forward-facing flanks, if present. The optically relevant regions can thus be arranged in an overall compact manner while, at the same time, making possible a high efficiency and a good and homogeneous light emission.

The depression can preferably be defined by the first outcoupling portion (if present) and/or the optical portion (if present), which results in an overall compact optical element of high optical quality.

The optical system elements of a pair of optical system elements are preferably designed so as to be (mirror-) symmetrical relative to one another, namely preferably with respect to a plane of symmetry separating them, which results in uniform light guidance and light emission, and furthermore improves the appearance of the optical element.

The pair of optical system elements can preferably be designed to be (mirror-) symmetrical, namely preferably with respect to a plane of symmetry separating them. This results in a light guidance that is uniform overall with respect to the optical element and in particular in a homogeneous light emission. This also results in an attractive aesthetic appearance of the optical element.

The optical element can preferably further have an optical edge, preferably a circumferentially closed optical edge, which extends away from the back side in order to project, on the back side, beyond the light entrance regions, preferably parallel to the vertical axis. Preferably, the optical edge together with at least part of the back side defines an optical compartment in which all light entrance regions of the optical element are arranged and in which preferably the light sources can be arranged. On the one hand, this optical edge can at least partially or completely close the optical element laterally toward the outside, namely at least on both sides in the direction of the offset axis or in a circumferentially closed manner. If necessary, the optical edge may serve for receiving and emitting (preferably in a defined manner) scattered light, which in turn further increases glare suppression for the optical element and its efficiency overall. Moreover, the optical edge can serve as protection for the light sources—even more so if the latter can be, or are, accommodated completely in the optical compartment.

The optical edge can furthermore serve to contact or receive a sealing element in order thus to seal off the optical compartment from a component of a luminaire, such as for example a luminaire housing, by applying the seal. A corresponding function can thus be provided integrally right away, which both simplifies the production and improves the handling and assembly as well as the functionality of the optical element.

The optical element can preferably comprise several of the pairs of optical system elements which are then arranged in rows along a longitudinal axis so as to form an elongated optical element with two rows of optical system elements. In other words, for example a left-hand one of the optical system elements is arranged in a row with all left-hand optical system elements of the pairs of optical system elements, and a respective right-hand one of the optical system elements is arranged in a row with all right-hand ones of the pairs of optical system elements. The respective light entrance regions can also be arranged in one row per optical system element, and thus in two preferably parallel rows. An elongated optical element can thus be provided so that the optical function, homogeneity, and high efficiency can also be transferred to elongated luminaires.

The several pairs of optical system elements are preferably all formed integrally with one another. The pairs of optical system elements can preferably be formed integrally with one another via their wing portions (if present). The optical element can thus have two elongated and, for example, V-shaped and longitudinally extending wing portions which comprise, for example, corresponding light entrance regions or lens heads distributed along the longitudinal axis in order thus to provide the pairs of optical system elements arranged in row configuration. An easy-to-produce elongated optical element having the highest functionality can thus be provided.

According to another aspect, the present invention further relates to a luminaire with an optical element according to the invention in accordance with the type described above and having a different light source per light entrance region, which light sources are arranged such that the light from the respective light source can enter the assigned optical system via the assigned light entrance region for influencing by the optical element. This provides a luminaire having all the above-described advantages of the optical element equipped therewith, which makes possible a particularly high efficiency with good glare suppression and high homogeneous light emission. The light entering through the distributed light sources per light entrance region passes through the optical element with the corresponding first and second light rays and optionally the third light rays in order to then leave the optical element at least partially via the front-side surface portion, as has been described above.

The light sources to be provided for the optical element, or provided for the luminaire, can preferably comprise LEDs. These LEDs can accordingly be provided as an LED module on a printed circuit board. It is conceivable that, for example, the LEDs of a pair of optical system elements are provided on a common printed circuit board. It is also conceivable that the LEDs of, for example, a row of optical system elements of an elongated optical element are provided together on one or more elongated printed circuit boards. It is also conceivable that, for example, several LEDs of several optical system elements of several pairs of optical system elements and preferably all LEDs of an (elongated) optical element or luminaire are provided together on a printed circuit board. The luminaire can thus be equipped with corresponding light sources in any desired manner.

Preferably, the luminaire further comprises a luminaire housing in which both the light sources and at least partially the optical element can be inserted and held. In this way, the luminaire can be provided in an easy-to-handle manner.

The light sources can preferably be accommodated in a luminaire compartment formed by the luminaire housing and by the optical element, which is preferably sealed and which particularly preferably also comprises the optical compartment. The optical edge can serve, for example, to support a corresponding sealing element that seals the optical element preferably in a circumferentially closed manner relative to the luminaire housing.

Further features and advantages of the present invention are described hereinafter with reference to the figures of the accompanying drawings.

DETAILED DESCRIPTION OF THE EMBODIMENT

Figure 6:
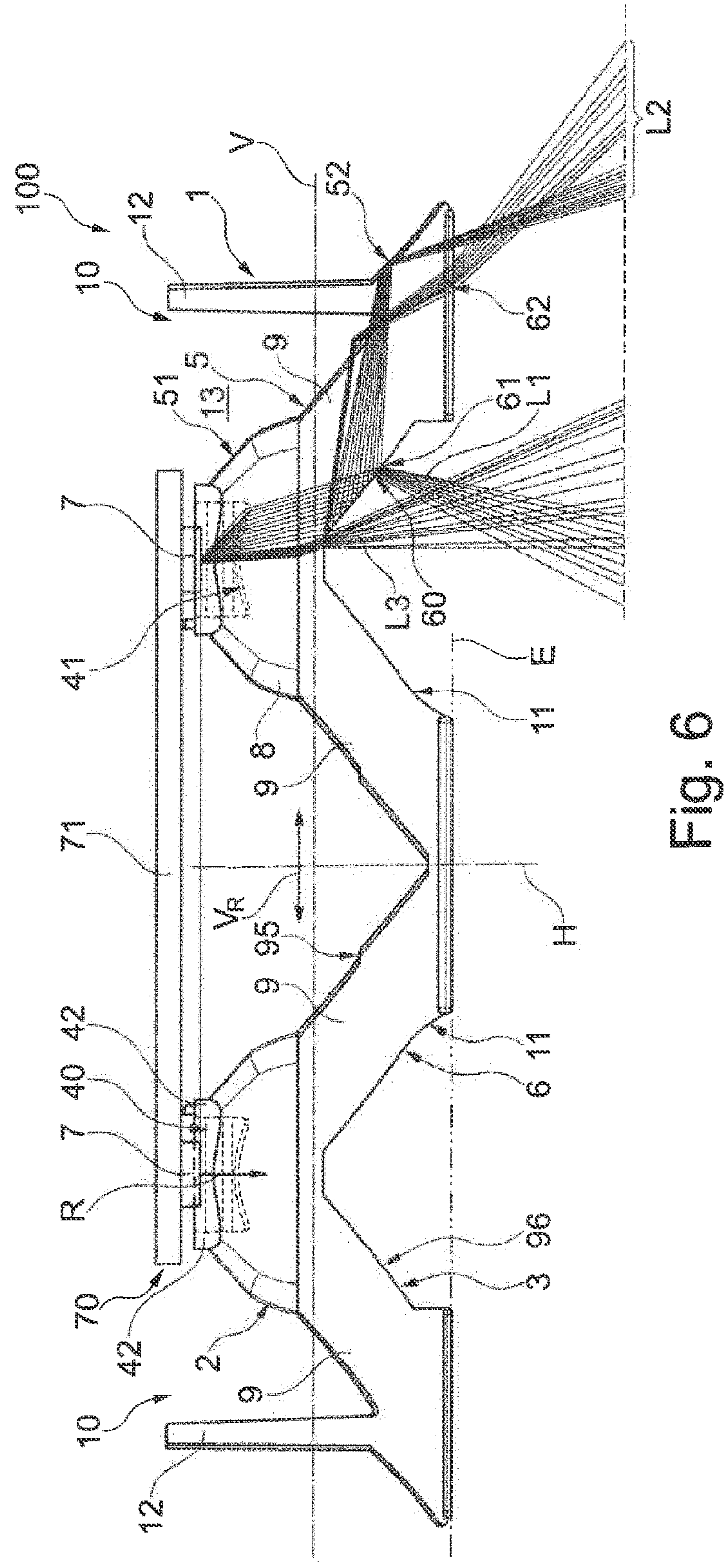
FIG. 6 shows a cross-sectional representation of a luminaire according to the invention with the optical element according to the invention according to FIG. 4 with an exemplary representation of first, second and third light rays.
Figure 7:
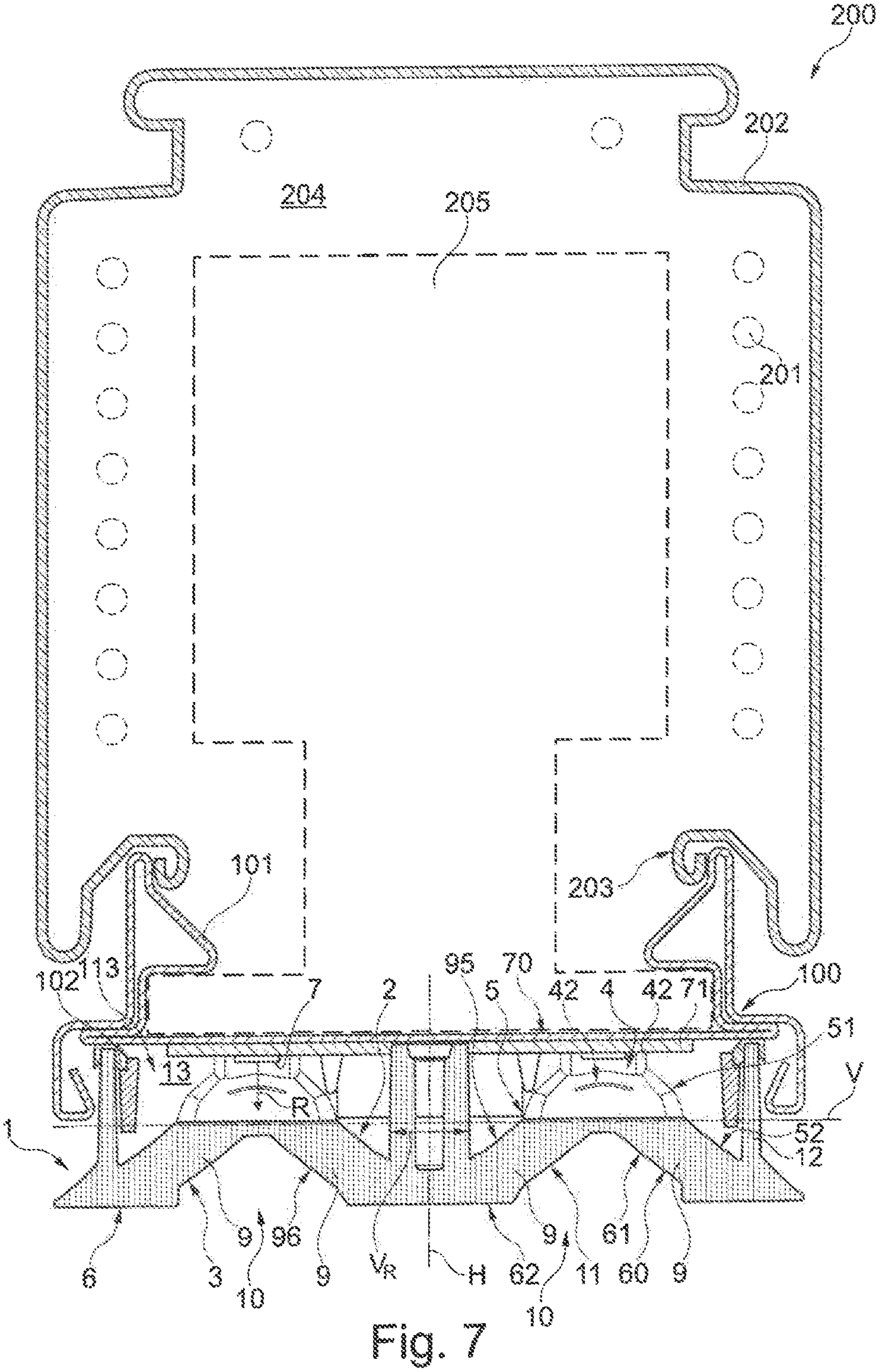
FIG. 7 shows a cross-sectional representation of the luminaire according to the invention according to FIG. 6 with further components.

The figures show an optical element 1 according to the invention for influencing light emitted by light sources 7 of a luminaire 100, and in FIGS. 6 and 7 a luminaire 100 equipped therewith. The light sources 7 preferably have LEDs which can be provided, for example, as LED module 70, as shown in FIGS. 6 and 7, on an (in this case common) printed circuit board 71.

The optical element 1 according to the invention is described below. The optical element 1 has a back side 2 facing the light sources 7 (in FIGS. 4, 6, and 7, the upper side in each case; in FIGS. 1 and 3, the side facing out of the drawing plane) and a front side 3 facing away from the light sources 7 (in FIGS. 4, 6, and 7, the underside in each case; in FIG. 2, the side facing out of the drawing plane).

The optical element 1 further has at least one pair of optical system elements 10, which are arranged offset next to one another laterally along an offset axis V and are furthermore integrally formed (i.e., formed in one piece) with one another, wherein the offset axis V extends in a left-to-right direction (offset direction $V_R$) in FIGS. 3, 4, 6, and 7. This offset is preferably lateral or orthogonal to a vertical axis H of the optical element 1, which vertical axis H is thus preferably aligned perpendicular to the offset axis V. As can be seen for example in FIG. 6, the vertical axis H is preferably aligned parallel to a main emission direction R of the light sources 7 that are to be assigned or have been assigned.

The optical system elements 10 are furthermore each optically assignable or assigned, to a different one of the light sources 7, as can be seen from the illustrated luminaires 100 in FIGS. 6 and 7.

The optical system elements 10 also together form the back side 2—thus each comprise part of the back side 2—and furthermore together form the front side 3—thus each comprise part of the front side 3, as can be seen in all figures.

A light entrance region 4 for light from the assigned light source 7 entering the respective optical system element 10 is formed on the back side 2 of each optical system element 10. Furthermore, a deflecting surface portion 5 is formed on the back side of each optical system element 10. This can be seen for example in FIGS. 3, 4, and 6.

Figure 2:
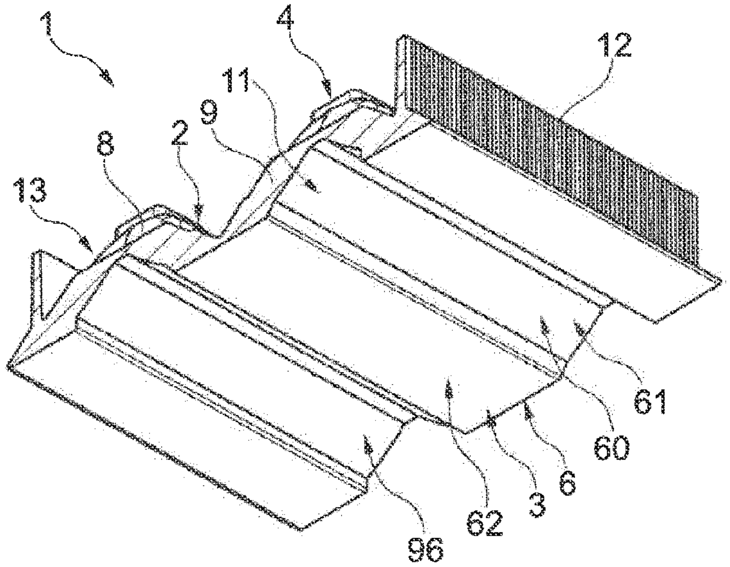
FIG. 2 shows a perspective front view of the optical element according to FIG. 1.
Figure 5:
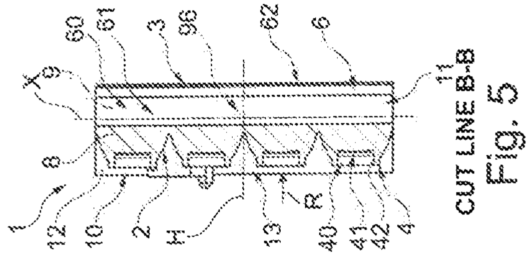
FIG. 5 shows a cross-sectional view of the optical element along cut line B-B (along the longitudinal axis) according to FIG. 3.
Figure 4:
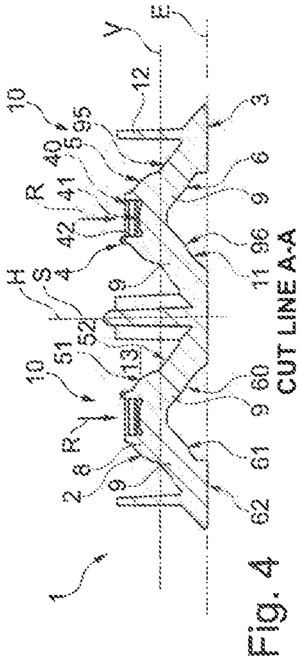
FIG. 4 shows a cross-sectional view of the optical element along cut line A-A (along the offset axis) according to FIG. 3.

Furthermore, a front-side surface portion 6 is formed on the front side 3 of each optical system element 10, as shown, for example, in FIGS. 2, 4, and 6.

Now, each optical system element 10 is designed so that first light rays L1 of the light from the assigned light source 7, which light rays enter the optical element 1 via the light entrance region 4, are directly (i.e., without further deflection in the optical element 1) incident on the deflecting surface portion 5, undergo total-internal reflection at the deflecting surface portion 5, and subsequently leave the optical element 1 via the front-side surface portion 6.

Each optical system element is further designed so that second light rays L2 of the light from the assigned light sources 7, which light rays enter the optical element via the light entrance region, are directly (i.e., without further deflection in the optical element 1) incident on the front-side surface portion 6, undergo total-internal reflection at the front-side surface portion 6, subsequently are incident on the deflecting surface portion 5, undergo total-internal reflection at the deflecting surface portion 5, and subsequently leave the optical element 1 via the front-side surface portion 6.

FIG. 6 shows by way of example the above-described light guidance of the first light rays L1 and of the second light rays L2.

Preferably, the optical system elements 10 can each be designed so that the first light rays L1 or the second light rays L2, after having undergone total-internal reflection at the deflecting surface portion 5, subsequently leave the optical element 1 directly (i.e., without further deflection in the optical element 1) via the front-side surface portion 6, as shown by way of example in FIG. 6.

Optionally, each optical system element 10 can be further designed so that third light rays L3 of the light from the assigned light source 7, which enter the optical element 1 via the light entrance region 4, directly (i.e., without further deflection in the optical element 1) leave the optical element 1 via the front-side surface portion 6, as is also shown by way of example in FIG. 6.

As can be seen in FIGS. 1, 3, 4, 6, and 7, the deflecting surface portion 5 can have at least a first deflection portion 51. This first deflection portion 51 serves for total-internal reflection of the first light rays L1. As can also be seen in these figures, the deflecting surface portion 5 can have at least a second deflection portion 52. This second deflection portion 52 serves for total-internal reflection of the second light rays L2. The first deflection portion 51 and the second deflection portion 52 are preferably provided as structurally separate units; i.e., they can be seen in defined and structurally separate regions, as shown by way of example in the figures.

As can be seen in the figures, the first deflection portion 51 is provided for example so as to be closer to the light entrance region 4 than the second deflection portion 52. The first deflection portion 51 thus merges into the adjacent second deflection portion 52.

As shown in particular in FIGS. 2, 6, and 7, the front-side surface portion 6 can have a first outcoupling portion 61 via which the first light rays L1 leave the optical element 1. The front-side surface portion 6 can further have at least a second outcoupling portion 62, via which the second light rays L2 leave the optical element 1, as also shown in the figures mentioned.

As can be seen in particular in FIGS. 4 and 6, the second outcoupling portion 62 can extend in a plane E. In the exemplary embodiment shown here, all second outcoupling portions 62 extend in one—i.e., in the same—plane E. The plane E is preferably aligned parallel to the offset axis V, as shown.

The front-side surface portion 6 preferably has an optical portion 60 which serves for total-internal reflection of the second light rays L2, as is shown by way of example in FIG. 6. The optical portion 60 and the first outcoupling portion 61 preferably overlap at least partially or are even identical, as shown by way of example in FIG. 6.

Figure 1:
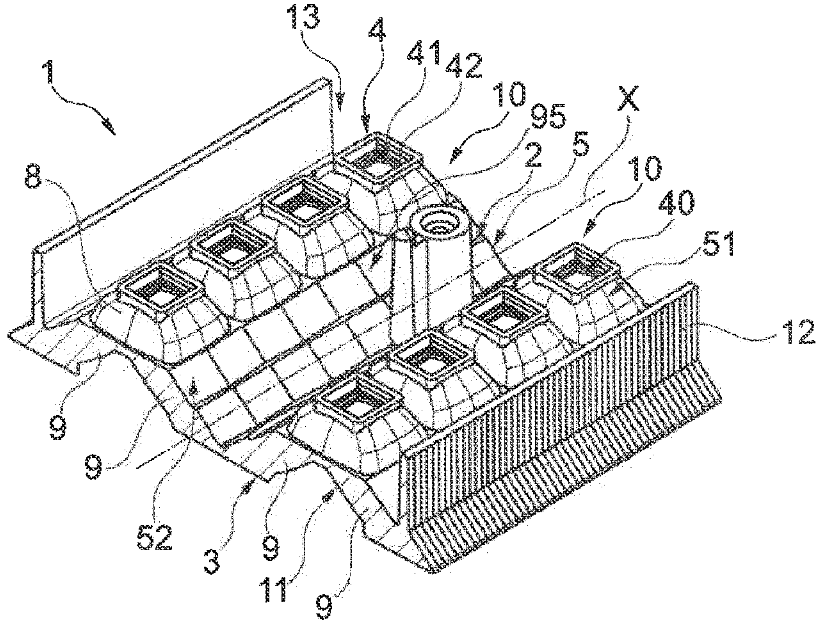
FIG. 1 shows a perspective rear view of an optical element according to a first exemplary embodiment of the present invention.
Figure 3:
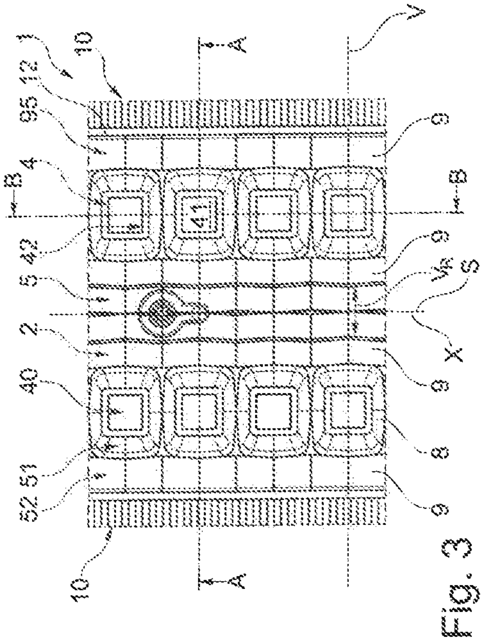
FIG. 3 shows a rear view of the optical element according to FIG. 1.

The light entrance regions 4 preferably each take the form of a recess 40 in the back side 2, as can be seen in particular in FIGS. 1, 3, and 6. The recess 40 is preferably designed so that it can at least partially or completely receive, or does receive at least partially or completely, the light source 7 assigned to the optical system element 10, as shown by way of example in FIGS. 6 and 7.

On its side facing the front side 3, the recess 40 is preferably defined by a bottom portion 41. The bottom portion 41 can be designed as a light-guiding portion in order to guide the second light rays L2 in a defined manner onto the front-side surface portion 6 or the optical portion 60, as shown in FIG. 6. The bottom portion 41 can be planar or, as shown in FIG. 6, curved or convex toward the recess 40.

The recess 40 can be defined laterally by at least one side wall portion 42. As shown in FIG. 6, the recess 40 can particularly preferably be defined laterally by at least two side wall portions 42 provided on opposite sides in the offset direction $V_R$. In a particularly preferred configuration, the recess, as shown in FIG. 6, can preferably be defined by the side wall portion(s) 42 so as to be laterally circumferentially closed.

The at least one side wall portion 42 can preferably take the form of a further light-guiding portion in order to guide the first light rays L1 in a defined manner onto the deflecting surface portion 5 or onto the first deflection portion 51, as shown by way of example in FIG. 6. As shown in FIG. 6, the at least one side wall portion 42 can be planar or curved or convex.

As can be seen in the figures, each of the optical system elements 10 can have a lens head 8 on its back side 2 which comprises the light entrance region 4 and at least part of the deflecting surface portion 5 or of the first deflection portion 51. Said part of the deflecting surface portion 5 or of the first deflection portion 51 can at least partially enclose the light entrance region 4 laterally, as can be seen in particular in FIG. 6. Preferably, said part of the deflecting surface portion 5 or of the first deflection portion 51 can flank the light entrance region 4 on both sides along the offset direction $V_R$ or offset axis V, or can even enclose the light entrance region 4 laterally so as to be circumferentially closed, as shown in FIG. 6.

As can be clearly seen in the figures, the optical system elements 10 can each have two wing portions 9. The wing portions 9 preferably extend obliquely forward (downward in FIGS. 4, 6, and 7) from the light entrance region 4 or from the lens head 8, and also away from one another. As can also be seen in the figures mentioned, the wing portions 9 of each optical system element 10 can extend in a V-shape flared manner from the light entrance region 4 or from the lens head 8 toward the front side 3.

One of the second outcoupling portions 62 can be provided for each wing portion 9 at an end 90 of the respective wing portion 9 facing away from the light entrance region 4, i.e., at each distal end 90 of the two wing portions 9 provided to the right and left of each optical system element 10 in the exemplary embodiment shown in FIG. 6.

Each wing portion 9 can be provided, on a forward-facing flank 96 of the respective wing portion 9, with one of the first outcoupling portions 61 or with one of the optical portions 60 (see, e.g., FIG. 6).

Each wing portion 9 can be provided with one of the second deflection portions 52 on a backward-facing flank 95 of the respective wing portion 9 (see, e.g., FIG. 6).

One of the wing portions 9 of each optical system element 10 can extend toward the respective other optical system element 10 of the pair of optical system elements 10, while the other one of the two wing portions 9 extends away from the respective other optical system element 10 of the pair of optical system elements 10, as shown in the exemplary embodiments shown in FIGS. 1, 2, 4, 6, and 7, where in each case two wing portions 9 directed toward one another (here in the middle of the optical element 1) and two wing portions 9 extending away from one another or rather away from the respective other optical system element 10 (i.e., the wing portions 9 of the optical element 1 which are located on the far right and far left) are shown.

As can also be gathered from the exemplary embodiments of the figures, the optical system elements 10 of the pair of optical system elements 10 can be formed integrally with one another via one of the wing portions 9—here, for example, the respective one wing portion 9—which are directed toward one another here. The integral connection preferably is located in this case in a small region, preferably near the front side 3.

As shown in FIGS. 1, 2, 4, and 6, the front-side surface portion 6 of each optical system element 10 can have a depression 11 directed toward the assigned light entrance region 4. As shown, the depression 11 can preferably taper toward the assigned light entrance region 4. The depression 11 can preferably be flanked laterally by the two wing portions 9 or their forward-facing flanks 96. The depression 11 is preferably defined by the first outcoupling portion 61 or the optical portion 60.

The optical system elements 10 of a pair of optical system elements 10 are preferably designed so as to be mirror-symmetrical relative to one another. The pair of optical system elements 10 can therefore be designed so as to be (mirror-) symmetrical, namely preferably with respect to a plane of symmetry S separating them, which is preferably oriented parallel to the vertical axis H of the optical element 1 or the main emission direction R of the light sources 7.

The optical element 1 can further have an optical edge, which extends away from the back side 2 in order to project, on the back side, beyond the light entrance regions 4, as can be seen, for example, in FIGS. 4 and 6.

The optical edge can preferably extend away from the back side 2 so as to define, together with at least part of the back side 2, an optical compartment 13, in which all light entrance regions 4 of the optical element 1 are arranged (see FIG. 1), and in which preferably the light sources 7 can be, or are, also arranged (see FIGS. 6 and 7).

As shown, the optical edge 12 can laterally define or flank the optical compartment 13 on both sides of the pair of optical system elements 10. However, the optical edge 12 can preferably also be laterally circumferentially closed, i.e., can laterally circumferentially define the optical compartment 13.

The optical element 1 can comprise several of the pairs of optical system elements 10 which are arranged in row configuration along a longitudinal axis X so as to form an elongated optical element 1 with two rows of optical system elements 10. Here, the light entrance regions 4 of the respective optical system elements 10 of the pairs of optical system elements 10 are preferably each arranged in a row, namely preferably each parallel to the longitudinal axis X and parallel to one another. The several pairs of optical system elements 10 are preferably all formed integrally with one another, namely furthermore preferably via their wing portions 9, as can be gathered in particular from FIGS. 1 to 5.

The exemplary embodiments of a luminaire 100 according to the invention shown in FIGS. 6 and 7 comprise the above-described optical element 1. Moreover, the luminaire 100 has a different light source 7 per light entrance region 4, which light sources 7 are arranged such that the light from the respective light source 7 can enter the assigned optical system 10 via the assigned light entrance region 4 for influencing by the optical element 1 in order to subsequently leave the optical element 1 at least partially via the front-side surface portion 6, as shown by way of example by the light paths of the first, second, and optional third light rays L1, L2, L3.

The luminaire 100 can further comprise a luminaire housing 101 in which not only the light sources 7 but also at least partially the optical element 1 can be inserted and held.

The light sources 7 can preferably be accommodated in a luminaire compartment 113 which is formed by the luminaire housing 101 and the optical element 1, and is preferably sealed. For this purpose, a seal 102 can be provided between the optical element 1—in particular its optical edge 12 on the one hand and the luminaire housing 101 on the other hand—in order to provide the luminaire 100 in accordance with a defined IP protection class.

The luminaire 100 shown here is, for example, a so-called FTL luminaire which can be used in a lighting system 200 having an elongated luminaire support rail 202. Such FTL luminaires usually have an elongated extension of usually 500 mm and can be arranged in any number in a row, and optionally interrupted by other electronic components, on the luminaire support rail 202 to form an elongated strip light. Such a lighting system 200 is shown by way of example in cross-section in FIG. 7.

The luminaire 100 can have, for example, mechanical coupling elements (not shown) and/or electrical coupling elements 205. The electrical coupling elements 205 are electrically connected or connectable to the light source 7 or LED module 70 and serve for an optionally electrical coupling of electrical lines 201 of the lighting system 200. In the exemplary embodiment shown, the lighting system 200 has a luminaire support rail 202 with a substantially U-shaped cross-section. The electrical coupling element 205 can be inserted into an interior 204 of the luminaire support rail 202, and thus into the luminaire support rail 202, via the lateral (here: lower) opening 203 formed by the U-shaped cross-section. In its interior 204, the luminaire support rail 202 comprises the electrical lines 201, which preferably run along the longitudinal direction (here: parallel to the longitudinal axis X), (here: on both sides at opposite side walls of the luminaire support rail 202). They are provided, for example, in the form of a power bar which carries the electrical lines 201 in an insulating body (not shown), so that the electrical lines 201 can be electrically contacted preferably over the entire length of the power bar or luminaire support rail 202 from within the interior 204 via the electrical coupling element 205 and preferably via electrical contacts (not shown), which project laterally from the electrical coupling element 205. In order to selectively provide and release electrical contacting in an easy manner, the electrical coupling element 205 can be designed, for example, as a so-called "rotary knob" as known, for example, from the applicant's "TECTON" system. After inserting the rotary knob 205 into the luminaire support rail 202, the electrical contacts are pivoted out laterally by rotation of the rotary knob 205 in order to be electrically contacted with the lines 201 of the power bar lying laterally therefrom.

Although a luminaire 100 in the form of an FTL luminaire has been described herein for illustrative purposes, the invention is not generally limited to luminaires of this type, but rather can be applied to any type of luminaire.

The present invention is not limited by the exemplary embodiments described above, provided it is covered by the subject-matter of the following claims.

The invention claimed is:

1. An optical element (1) for influencing light emitted by light sources (7), the optical element (1) comprising:

a back side (2) facing the light sources (7); and a front side (3) facing away from the light source (7);

wherein the optical element (1) has at least one pair of optical system elements (10) which are arranged offset next to one another laterally along an offset axis (V) and are integrally formed with one another, which are each optically assignable to a different one of the light sources (7), and which together form the back side (2) and together form the front side (3);

wherein a light entrance region (4) for light from the assigned light source (7) entering the respective optical system element (10) is formed on the back side (2) of each optical system element (10), and a deflecting surface portion (5) is formed on the back side (2) of each optical system element (10);

wherein a front-side surface portion (6) is formed on the front side (3) of each optical system element (10);

wherein each optical system element (10) is designed so that first light rays (L1) of the light from the assigned light source (7), which light rays enter the optical element (1) via the light entrance region (4), are directly incident on the deflecting surface portion (5), undergo total-internal reflection at the deflecting surface portion (5), and subsequently leave the optical element (1) via the front-side surface portion (6), and second light rays (L2) of the light from the assigned light source (7), which light rays enter the optical element (1) via the light entrance region (4), are directly incident on the front-side surface portion (6), undergo total-internal reflection at the front-side surface portion (6), subsequently are incident on the deflecting surface portion (5), undergo total-internal reflection at the deflecting surface portion (5), and subsequently leave the optical element (1) via the front-side surface portion (6); and wherein the front-side surface portion (6) has at least a first outcoupling portion (61) via which the first light rays (L1) leave the optical element (1), the front-side surface portion (6) has at least a second outcoupling portion (62) via which the second light rays (L2) leave the optical element (1); and all second outcoupling portions (62) extend in one plane (E) which is aligned parallel to the offset axis (V).

2. The optical element (1) according to claim 1, wherein the optical system elements (10) of the pair of optical system elements (10) are arranged offset next to one another laterally along the offset axis (V) with respect to a vertical axis (H) of the optical element (1), wherein the vertical axis (H) is aligned parallel to a main emission direction (R) of the light sources (7).

3. The optical element (1) according to claim 1, wherein the optical system elements (10) are each designed so that the first light rays (L1) and/or the second light rays (L2), after having undergone total-internal reflection at the deflecting surface portion (5), subsequently leave the optical element (1) directly via the front-side surface portion (6).

4. The optical element (1) according to claim 1, wherein the deflecting surface portion (5) has at least a first deflection portion (51) which serves for total-internal reflection of the first light rays (L1), and/or wherein the deflecting surface portion (5) has at least a second deflection portion (52) which serves for total-internal reflection of the second light rays (L2).

5. The optical element (1) according to claim 4, wherein the first deflection portion (51) and the second deflection portion (52) are provided as structurally separate units, and/or wherein the first deflection portion (51) is closer to the light entrance region (4) than is the second deflection portion (52).

6. The optical element (1) according to claim 1, wherein the front-side surface portion (6) has an optical portion (60) which serves for total-internal reflection of the second light rays (L2).

7. The optical element (1) according to claim 1, wherein the first outcoupling portion (61) and the optical portion (60) overlap at least partially or are identical.

8. The optical element (1) according to claim 1, wherein the light entrance regions (4) are each designed as a recess (40) in the back side (2).

9. The optical element (1) according to claim 8, wherein the recess (40) is designed so as to at least partially or completely receive the light source (7) assigned to the optical system element (10).

10. The optical element (1) according to claim 8, wherein the recess (40) is defined by a bottom portion (41) on its side facing the front side (3).

11. The optical element (1) according to claim 10, wherein the bottom portion (41) is designed as a light-guiding portion in order to guide the second light rays (L2) in a defined manner onto the front-side surface portion (6) and onto the optical portion (60), if present, and/or wherein the bottom portion (41) is planar, or curved or convex toward the recess (40).

12. The optical element (1) according to claim 8, wherein the recess (40) is defined laterally by at least one side wall portion (42), wherein the recess (40) is defined laterally by at least two side wall portions (42) provided on opposite sides in the offset direction, and/or wherein the recess (40) is defined by the side wall portion(s) (42) so as to be laterally circumferentially closed.

13. The optical element (1) according to claim 12, wherein the at least one side wall portion (42) is designed as a further light-guiding portion in order to guide the first light rays (L1) in a defined manner onto the first deflection portion (51) of the deflecting surface portion (5), and/or wherein the at least one side wall portion (42) is planar or curved or convex.

14. The optical element (1) according to claim 1, wherein each of the optical system elements (10) has a lens head (8) on its back side (2) which comprises the light entrance region (4) and the first deflection portion (51) of the deflecting surface portion (5).

15. The optical element (1) according to claim 14, wherein the part of the deflecting surface portion (5) at least partially encloses the light entrance region (4) laterally and flanks the light entrance region (4) on both sides along the offset direction, or encloses the light entrance region (4) laterally such as to be circumferentially closed.

16. An optical element (1) for influencing light emitted by light sources (7), the optical element (1) comprising:

a back side (2) facing the light sources (7); and a front side (3) facing away from the light source (7);

wherein the optical element (1) has at least one pair of optical system elements (10) which are arranged offset next to one another laterally along an offset axis (V) and are integrally formed with one another, which are each optically assignable to a different one of the light sources (7), and which together form the back side (2) and together form the front side (3);

wherein a light entrance region (4) for light from the assigned light source (7) entering the respective optical system element (10) is formed on the back side (2) of each optical system element (10), and a deflecting surface portion (5) is formed on the back side (2) of each optical system element (10);

wherein a front-side surface portion (6) is formed on the front side (3) of each optical system element (10);

wherein each optical system element (10) is designed so that first light rays (L1) of the light from the assigned light source (7), which light rays enter the optical element (1) via the light entrance region (4), are directly incident on the deflecting surface portion (5), undergo total-internal reflection at the deflecting surface portion (5), and subsequently leave the optical element (1) via the front-side surface portion (6), and second light rays (L2) of the light from the assigned light source (7), which light rays enter the optical element (1) via the light entrance region (4), are directly incident on the front-side surface portion (6), undergo total-internal reflection at the front-side surface portion (6), subsequently are incident on the deflecting surface portion (5), undergo total-internal reflection at the deflecting surface portion (5), and subsequently leave the optical element (1) via the front-side surface portion (6);

wherein the optical system elements (10) each have two wing portions (9), and the wing portions (9) of each optical system element (10) extend obliquely forward from the light entrance region (4) and away from one another.

17. The optical element (1) according to claim 16, wherein each wing portion (9) is provided with one of the second deflection portions (52) on a backward-facing flank (95) of the respective wing portion (9).

18. The optical element (1) according to claim 16, wherein one of the wing portions (9) of each optical system element (10) extends toward the respective other optical system element (10) of the pair of optical system elements (10), and the other one of the two wing portions (9) extends away from the respective other optical system element (10) of the pair of optical system elements (10).

19. The optical element (1) according to claim 16, wherein the optical system elements (10) of the pair of optical system elements (10) are formed integrally with one another via one of the wing portions (9).

20. The optical element (1) according to claim 16, wherein the front-side surface portion (6) has a depression (11) directed toward the light entrance region (4), wherein the depression (11) tapers toward the light entrance region (4), wherein the depression (11) is flanked laterally by the two wing portions (9)

wherein the depression (11) is defined by the first out-coupling portion (61) and the optical portion (60).

21. The optical element (1) according to claim 1, wherein the optical system elements (10) of a pair of optical system elements (10) are designed so as to be symmetrical, and/or wherein the pair of optical system elements (10) is designed so as to be symmetrical with respect to a plane of symmetry (S) separating them.

22. The optical element (1) according to claim 1, further comprising a circumferentially closed optical edge (12), which extends away from the back side (2) in order to project, on the back side, beyond the light entrance regions (4), wherein the optical edge (12) extends away from the back side (2) such as to define, together with at least part of the back side (2), an optical compartment (13), in which all light entrance regions (4) of the optical element (1) are arranged, and in which the light sources (7) can be also arranged.

23. The optical element (1) according to claim 1, wherein the optical element (1) has several of the pairs of optical system elements (10) which are arranged in row configuration along a longitudinal axis (X) so as to form an elongated optical element (1) with two rows of optical system elements (10).

24. The optical element (1) according to claim 23, wherein the several pairs of optical system elements (10) are all formed integrally with one another via their wing portions (9).

25. A luminaire (100), comprising:

an optical element (1) according to claim 1, and a different light source (7) per light entrance region (4), which light sources (7) are arranged such that the light from the respective light source (7) can enter the assigned optical system element (10) via the assigned light entrance region (4) for influencing by the optical element (1).

26. The luminaire according to claim 25, wherein the light sources (7) comprise LEDs.

27. The luminaire according to claim 25, further comprising a luminaire housing (101) in which both the light sources (7) and at least partially the optical element (1) are inserted and held, wherein the light sources (7) are accommodated in a luminaire compartment (113) which is formed by the luminaire housing (101) and the optical element (1), and is sealed.

28. An optical element (1) for influencing light emitted by light sources (7), the optical element (1) comprising:

a back side (2) facing the light sources (7); and a front side (3) facing away from the light source (7);

wherein the optical element (1) has at least one pair of optical system elements (10) which are arranged offset next to one another laterally along an offset axis (V) and are integrally formed with one another, which are each optically assignable to a different one of the light sources (7), and which together form the back side (2) and together form the front side (3);

wherein a light entrance region (4) for light from the assigned light source (7) entering the respective optical system element (10) is formed on the back side (2) of each optical system element (10), and a deflecting surface portion (5) is formed on the back side (2) of each optical system element (10);

wherein a front-side surface portion (6) is formed on the front side (3) of each optical system element (10);

wherein each optical system element (10) is designed so that first light rays (L1) of the light from the assigned light source (7), which light rays enter the optical element (1) via the light entrance region (4), are directly incident on the deflecting surface portion (5), undergo total-internal reflection at the deflecting surface portion (5), and subsequently leave the optical element (1) via the front-side surface portion (6), second light rays (L2) of the light from the assigned light source (7), which light rays enter the optical element (1) via the light entrance region (4), are directly incident on the front-side surface portion (6), undergo total-internal reflection at the front-side surface portion (6), subsequently are incident on the deflecting surface portion (5), undergo total-internal reflection at the deflecting surface portion (5), and subsequently leave the optical element (1) via the front-side surface portion (6); and wherein the wing portions (9) of each optical system element (10) extend in a V-shaped flared manner from the light entrance region (4) toward the front side (3).

* * * * *